(12) United States Patent
Buarzaiga et al.

(10) Patent No.: US 7,641,801 B2
(45) Date of Patent: Jan. 5, 2010

(54) METHOD FOR REMOVING MANGANESE FROM NICKEL LATERITE WASTE LIQUORS

(75) Inventors: Mohamed Buarzaiga, Mississauga (CA); Eric Devuyst, Stoney Creek (CA); Julian Edwards, Moffat (CA); Joe Paventi, Multon (CA)

(73) Assignee: Vale Inco Limited, Toronto (CA)

(*) Notice: Subject to any disclaimer, the term of this patent is extended or adjusted under 35 U.S.C. 154(b) by 494 days.

(21) Appl. No.: 11/679,917

(22) Filed: Feb. 28, 2007

(65) Prior Publication Data

US 2008/0203032 A1 Aug. 28, 2008

(51) Int. Cl.
C02F 1/64 (2006.01)
(52) U.S. Cl. .................. 210/711; 210/713; 210/714; 210/722; 210/725; 210/727; 210/737; 210/912; 423/50
(58) Field of Classification Search .................. 210/722
See application file for complete search history.

(56) References Cited

U.S. PATENT DOCUMENTS

| | | | | |
|---|---|---|---|---|
| 1,714,828 | A * | 5/1929 | Travers | 210/722 |
| 2,311,314 | A | 2/1943 | Reichert et al. | 210/23 |
| 3,337,452 | A * | 8/1967 | Teske et al. | 210/711 |
| 3,738,932 | A | 6/1973 | Kostenbader | 210/46 |
| 4,198,377 | A * | 4/1980 | Burkin et al. | 423/50 |
| 4,465,597 | A | 8/1984 | Herman et al. | 210/73 |
| 5,039,428 | A * | 8/1991 | Wentzler et al. | 210/711 |
| 5,427,691 | A * | 6/1995 | Kuyucak et al. | 210/713 |
| 5,672,280 | A * | 9/1997 | Demopoulos et al. | 210/709 |
| 6,245,240 | B1 * | 6/2001 | Noble | 210/711 |
| 6,254,782 | B1 * | 7/2001 | Kreisler | 210/710 |

(Continued)

FOREIGN PATENT DOCUMENTS

CA 1183974 3/1985

(Continued)

OTHER PUBLICATIONS

J. Berglund, S. Fronaeus, and L.I. Elding, "Kinetics and Mechanism for Manganese-Catalyzed Oxidation of Sulfur(IV) by Oxygen in Aqueous Solution" Inorg. Chem. 32 (1993): p. 4527-4538.

(Continued)

Primary Examiner—Peter A Hruskoci
(74) Attorney, Agent, or Firm—Edward A. Steen (57) ABSTRACT

A method and system of removing or decreasing waste liquor manganese concentration to less than about 1 mg/L total manganese without the precipitation of significant amounts of magnesium. The method and system include steps for treating the waste liquor using three separate circuits in which in the first circuit, manganese is reduced, for example, from about 2 g/L to <500 mg/L using pH adjustment with a suitable neutralizing agent; and in the second circuit, the final target manganese level is achieved by oxidative precipitation using a suitable oxidizing agent. Part of the precipitated manganese product, e.g., $MnO_2$, is recycled to the oxidative precipitation circuit as seed and the balance proceeds to a third circuit wherein the precipitated manganese product is re-dissolved, and then recycled to the first neutralization circuit. In the first neutralization circuit and the second oxidative precipitation circuit, the process conditions are selected to minimize the precipitation of magnesium, e.g., $Mg(OH)_2$.

49 Claims, 3 Drawing Sheets

U.S. PATENT DOCUMENTS 6,656,247 B1 * 12/2003 Genik-Sas-Berezowsky et al. ............................ 75/710
7,201,856 B2 *  4/2007 Souter et al. ................ 252/181

FOREIGN PATENT DOCUMENTS

| CA | 1241774 | 9/1988 |
| CA | 2255874 | 12/1998 |
| CA | 0056943 | 3/2000 |
| WO | 0056943 | 9/2000 |
| WO | 03/054238 | 7/2003 |

OTHER PUBLICATIONS

J. Berglund and L.I. Elding, "Reaction of Peroxomonosulfate Radical with Manganese(II) in Acidic Aqueous Solution" J. Chem. Soc., Faraday Trans, 90 (21), (1994): p. 3309-3313.

W. Zhang, P. Singh, D. Muir, "Oxidative Precipitation of Manganese with $SO_2/O_2$ and Separation from Cobalt and Nickel", Hydrometallurgy 63, 2002, pp. 127-135.

W. Zhang, "$SO_2/O_2$ as an Oxidant in Hydrometallurgy", Ph.D. Thesis, Murdoch University, Western Australia, Feb. 2000, pp. 182-185.

* cited by examiner

METHOD FOR REMOVING MANGANESE FROM NICKEL LATERITE WASTE LIQUORS

FIELD AND BACKGROUND OF THE INVENTION

The present invention relates to the hydrometallurgical processing of nickel laterite ores and, in particular, to an improved method and system for selectively removing manganese (Mn) from nickel laterite waste liquors, allowing the effluent stream to be safely discharged to the environment.

Most of the world's remaining nickel (Ni) resources are contained in nickel laterites. These oxidic ores attracted considerable attention from nickel producers in recent years, especially for the application of leaching technology. This was partly due to advancements in pressure autoclave technology and materials of construction, large available ore bodies, and amenability of deposits to surface mining methods. The low-Mg, high-Fe limonitic fraction of the laterite profile is best suited for hydrometallurgical processing. The laterite projects developed over the past 15 years used exclusively high-pressure acid leaching (HPAL) to process the limonitic ores.

An important consideration in the processing of the limonitic ores is the disposal of waste products. Typically, large waste streams are generated in the process. A plant that produces 60,000 tonnes/year nickel could generate 2000-3000 m$^3$/h of liquid waste. These large volumes arise from the need to process large tonnage of ores since the grade of the limonitic ore (1-1.6% Ni) is relatively low and the ore is not amenable to standard concentration methods owing to the presence of the paymetals (nickel and cobalt) in solid solution within the host minerals.

The HPAL process dissolves most of the ore solids releasing both the paymetals and the associated impurities. The main impurities are iron (Fe), manganese (Mn), aluminum (Al), silicon (Si), chromium (Cr), and magnesium (Mg). Some of the impurities, notably Fe, enter the solution and then undergo hydrolytic precipitation reactions within the autoclave and report to the leach residue. Despite this initial rejection of impurities, the autoclave discharge still contains significant amounts of impurities, which are separated in a series of unit operations.

Manganese and magnesium are two elements that dissolve in the autoclave and persist in solution. The waste liquor from the HPAL process typically contains about 1-3 g/L Mn and 2-15 g/L Mg, depending on the feed composition. Manganese is an environmentally regulated element requiring removal to less than 1 mg/L before the treated liquid stream can be safely discharged to the environment.

The standard practice used in the recently proposed laterite projects is to remove the Mn in the effluent stream as $Mn(OH)_2$ by pH adjustment using lime neutralization. A pH in the range 8.5-9.5 is required to achieve less than 1 mg/L Mn. The main drawbacks of this approach are high reagent consumption due to the co-precipitation of nearly all the Mg (>98% Mg precipitation) as $Mg(OH)_2$ and poor settling properties of the precipitated mixed Mn/Mg hydroxide product. The hydroxide product is gelatinous and difficult to handle and pump. Also, the additional Mg precipitation increases the tailings tonnage, and since the mixed hydroxide product is low-density, the consolidated settled density of the tailings in the storage pond is lower, significantly raising the required annual storage volume.

An alternative approach is to use oxidative methods to precipitate Mn. The oxide product settles and filters well. However, it has a high oxidizing capacity and there exists the possibility of undesirable side reactions during the disposal and storage of the Mn oxide waste stream; it is known, for example, that the manganese oxide product can oxidize chromium that is universally present in the effluent residues, releasing toxic hexavalent chromium ($Cr^{6+}$)) into the residue pond water. Also, the removal of all the Mn by oxidative methods alone will be uneconomical because of the high level of Mn in the effluent stream and the high cost of oxidants.

Manganese can be readily oxidized to Mn (IV) and precipitated using many oxidants, such a mixture of $SO_2$ and $O_2$ or air. However, the $SO_2/O_2$ chemistry is not well understood and each aqueous system will have a different response to the application of this oxidant, depending on the prevailing chemistry of the system.

Berglund et al. reported that the addition of $Mn^{3+}$ significantly increased the oxidation rate of $Mn^{2+}$. See [1] J. Berglund, S. Fronaeus, and L. I. Elding, "Kinetics and Mechanism for Manganese-Catalyzed Oxidation of Sulfur(IV) by Oxygen in Aqueous Solution" Inorg. Chem. 32 (1993): p. 4527-4538; [2] J. Berglund and L. I. Elding, "Reaction of Peroxomonosulfate Radical with Manganese(II) in Acidic Aqueous Solution" J. Chem. Soc., Faraday Trans, 90 (21), (1994): p. 3309-3313. Zhang et al. showed that the addition of 2.7 mM hydroquinone, which is a free radical scavenger and effective reductant of $Mn^{3+}$ and peroxy species, could completely stop the oxidation reaction. See [3] W. Zhang, P. Singh, D. Muir, "Oxidative Precipitation of Manganese with $SO_2/O_2$ and Separation from Cobalt and Nickel", Hydrometallurgy 63, 2002, pp. 127-135; [4] W. Zhang, "$SO_2/O_2$ as an Oxidant in Hydrometallurgy", Ph.D. Thesis, Murdoch University, Western Australia, February 2000.

Several patents have been filed for the use of $SO_2$/air in effluent treatment: for mine drainage and waste pickling liquor (U.S. Pat. No. 3,738,932), for removing heavy metals from wastewater (Canadian Pat. No. 1,183,974), for removing arsenic from solutions containing sulfur dioxide (Canadian Pat. No. 2,255,874), and for removing cyanide, arsenic, and antimony from effluent streams (Canadian Pat. No. 1,241,774). These effluent streams have entirely different properties and requirements from those of laterite leaching waste liquors.

Various methods for the removal of Mn using the $SO_2/O_2$ or air method are known. Examples of such methods are taught in WO 00/56943 and WO 03/054238. However, both references are concerned with the purification of cobalt (Co) solutions and neither refers to the treatment of laterite waste liquors or, more importantly, the need to reduce total Mn to extremely low levels, less than 1 mg/L.

SUMMARY OF THE INVENTION

It is an object of this invention to provide a method and system that can remove or reduce the total Mn level below 1 mg/L while mitigating the disadvantages described above. Total Mn represents the sum of soluble Mn and the Mn contained in the solids suspended in the effluent stream.

The present invention is a method and system of decreasing the effluent Mn concentration to less than 1 mg/L total Mn without the precipitation of significant amounts of Mg. The method involves treating the HPAL waste liquor using three separate circuits: in the first circuit, Mn is reduced preferably from about 2 g/L to <500 mg/L using pH adjustment with a neutralizing agent (e.g., lime and limestone); and in the second circuit, the final target Mn level is achieved by oxidative precipitation using an oxidizing agent (e.g., air-$SO_2$ mixture) in the pH range of about 5 to 8. One of the requirements of the present invention is to find a way of handling the $MnO_2$ generated in the oxidative precipitation circuit. $MnO_2$ is a strong oxidant and its disposal with the remainder of the plant solids could present other problems, e.g., the oxidative leaching of Cr in the solids to the toxic hexavalent Cr. Therefore, part of the precipitated Mn oxide is recycled to the oxidative precipitation circuit as seed and the balance proceeds to a third circuit wherein the precipitated Mn oxide product is re-dissolved, for example, using $SO_2$ and $H_2SO_4$, and then recycled to the first neutralization (or lime precipitation) circuit.

In the lime and oxidative precipitation circuits, the process conditions are selected to minimize the precipitation of $Mg(OH)_2$. With this combined approach, the concentration of total Mn in the final effluent discharge could be reduced to less than 1 mg/L with less than 1% Mg co-precipitation and no $MnO_2$ disposal problems. Comparison of the total lime neutralization method with the proposed combined approach indicated a significant economic advantage to the combined approach.

It is another object of the present invention to provide a method of removing manganese from waste liquor at least containing manganese and magnesium, comprising the steps of (a) adding a first neutralizing agent to a first mixture of waste liquor and a recycled solution of the method to precipitate a majority of the manganese as manganese-containing solids, without precipitating a substantial amount of the magnesium; (b) separating the manganese-containing solids to form a manganese-depleted solution; (c) oxidizing a second mixture of the manganese-depleted solution formed in step (b) and a separated manganese precipitate of the method with an oxidizing agent while adjusting the pH with a second neutralizing agent to form an aqueous solution containing manganese precipitate; (d) transferring the aqueous solution formed in step (c) to a thickener to produce an overflow solution containing a quantity of manganese which is below a predetermined environmental discharge criteria and an underflow solution containing manganese precipitate; (e) discharging the overflow and underflow solutions from the thickener; (f) separating the manganese precipitate from the underflow solution; (g) recycling a portion of the separated manganese precipitate to step (c); (h) dissolving a remaining portion of the separated manganese precipitate to form the recycled solution; and (i) transferring the recycled solution to step (a).

It is a further object of the present invention to provide a method of removing manganese from waste liquor at least containing manganese and magnesium, comprising the steps of: (a) adjusting the pH of a first mixture of waste liquor and a recycled solution of the method to about 8-8.5 with a first neutralizing agent to precipitate a majority of the manganese as manganese-containing solids, without precipitating a substantial amount of the magnesium; (b) removing the manganese-containing solids to form a manganese-depleted solution; (c) oxidizing a second mixture of the manganese-depleted solution formed in step (b) and a separated manganese precipitate of the method with an oxidizing agent while controlling the pH with a second neutralizing agent to form an aqueous solution containing manganese precipitate; (d) mixing the aqueous solution with a flocculating agent; (e) transferring the mixture formed in step (d) to a thickener to produce an overflow solution containing less than 1 mg/L of manganese and an underflow solution containing manganese precipitate; (f) discharging the overflow and underflow solutions from the thickener; (g) separating the manganese precipitate from the underflow solution; (h) recycling a portion of the separated manganese precipitate to step (c); (i) dissolving a remaining portion of the separated manganese precipitate to form the recycled solution; and (j) transferring the recycled solution to step (a), wherein in step (c), the pH is adjusted to about 6.5 and the temperature is adjusted to about 40° C.

A still further object of the present invention is to provide a method of removing manganese from waste liquor at least containing manganese and magnesium, comprising the steps of: (a) mixing a first neutralizing agent and the waste liquor to adjust the pH to about 8-8.5 and to precipitate a majority of the manganese as manganese-containing solids, without precipitating a substantial amount of the magnesium; (b) removing the manganese-containing solids to form a manganese-depleted solution; (c) oxidizing a mixture of the manganese-depleted solution and a separated manganese precipitate of the method with an oxidizing agent while adjusting the pH to about 1.5-8 with a second neutralizing agent to form an aqueous solution containing manganese precipitate; (d) transferring the aqueous solution formed in step (c), preferably mixed with a flocculating agent, to a thickener to produce an overflow solution containing a quantity of manganese which is below a predetermined environmental discharge criteria and an underflow solution containing manganese precipitate; (e) discharging the overflow and underflow solutions from the thickener; (f) separating the manganese precipitate from the underflow solution; and (g) recycling a portion of the separated manganese precipitate to step (c).

A further object of the present invention is to provide a method of selectively decreasing waste liquor Mn concentration to about or less than 1 mg/L total Mn while minimizing the precipitation of Mg, comprising: decreasing waste liquor Mn concentration from about 2 g/L to <500 mg/L by effecting pH adjustment with a suitable neutralizing agent; decreasing Mn concentration of pH adjusted waste liquor to less than 1 mg/L by effecting oxidative precipitation with a suitable oxidizing agent; recovering manganese precipitate formed in the second reducing step; recycling a portion of the recovered manganese precipitate to the second reducing step; dissolving a remaining portion of the recovered manganese precipitate; and recycling the dissolved manganese precipitate to the first reducing step.

A further object of the present invention is to provide a system of selectively decreasing waste liquor Mn concentration to about or less than 1 mg/L total Mn while minimizing the precipitation of Mg, comprising: means for decreasing waste liquor Mn concentration from about 2 g/L to <500 mg/L by effecting pH adjustment with a suitable neutralizing agent; means for decreasing Mn concentration of pH adjusted waste liquor to less than 1 mg/L by effecting oxidative precipitation with a suitable oxidizing agent; means for recovering manganese precipitate formed in the second reducing means; means for recycling a portion of the recovered manganese precipitate to the second reducing means; means for dissolving a remaining portion of the recovered manganese precipitate; and means for recycling the dissolved manganese precipitate to the first reducing means.

The various features of novelty which characterize the invention are pointed out with particularity in the claims annexed to and forming a part of this disclosure. For a better understanding of the invention, its operating advantages and the specific objects attained by its uses, reference is made to the accompanying drawings and descriptive matter in which preferred embodiments of the invention are illustrated.

DESCRIPTION OF THE PREFERRED EMBODIMENTS

Figure 1:
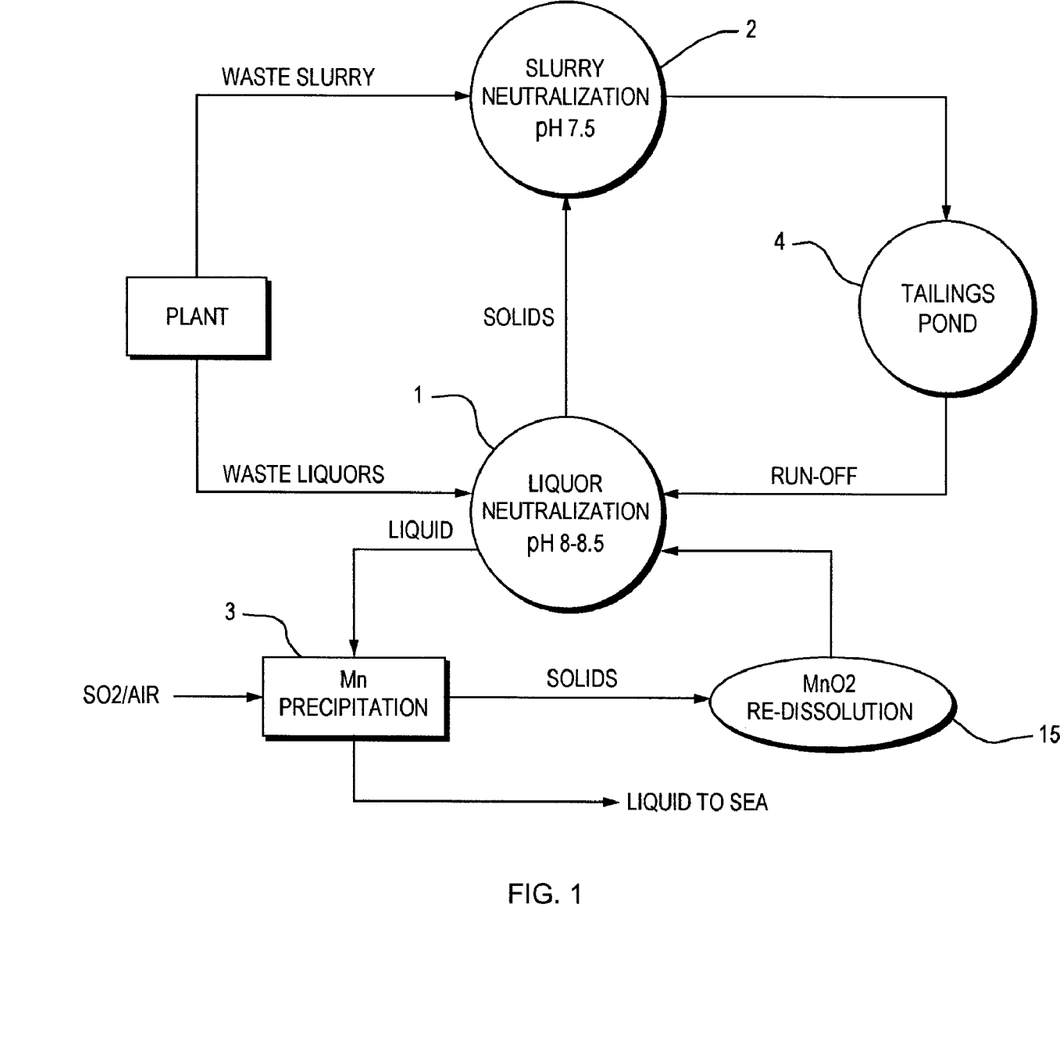
FIG. 1 is a schematic diagram of a Mn removal method and system of the present invention.

Referring now to the drawings, in which like reference numerals are used to refer to the same or similar elements, FIG. 1 is a schematic diagram of a Mn removal or reduction method and system of the present invention. Waste liquor from, for example, the HPAL process is sent to the waste liquor neutralization circuit 1 to reduce the concentration of manganese, preferably, to less than 500 mg/L.

The term "about" before a series of values, unless otherwise indicated, will be interpreted as applying to each value in the series.

Figure 2:
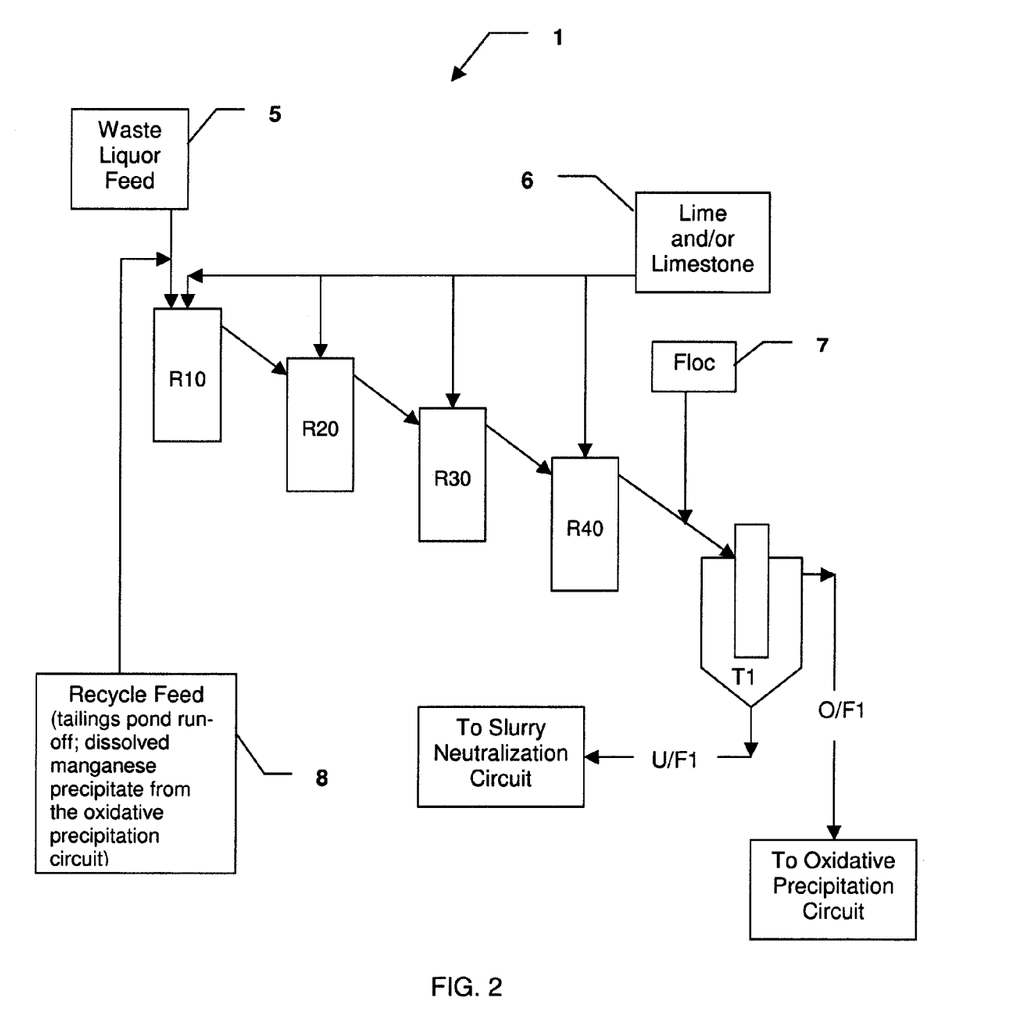
FIG. 2 is a schematic diagram of a waste liquor neutralization circuit of the present invention.

FIG. 2 shows one possible arrangement of a waste liquor neutralization circuit 1 of the present invention. Manganese in the waste liquor is first reduced, for example, from about 2 g/L to <500 mg/L using pH adjustments with lime and/or limestone or with other suitable neutralizing agent in the waste liquor neutralization circuit 1. Examples of suitable neutralizing agents include, without limitation, alkali or alkaline earth metal compounds, sodium hydroxide, ammonium hydroxide, potassium hydroxide, sodium carbonate and calcium carbonate.

The waste liquor neutralization circuit 1, as shown in FIG. 2 and in a non-limiting way, comprises four reactors (R10-R40) arranged in series followed by a thickener (T1). The liquor neutralization circuit may include a feed tank 5, a lime tank 6, a flocculent tank 7, and a recycle feed tank 8. It will be appreciated that although four reactors are illustrated, a greater or lesser number can be employed, usually one to four reactors. It will also be appreciated that one or more reactors may be employed for increasing the retention time and mixing of the pH adjusted waste liquor without introducing any reagents. Flocculating agents and similar acting compositions include, for example, Superfloc™ A-110 and Superfloc™ A-130, manufactured by Cytec Industries.

Preferably, the pH is stepped up in each reactor (R10-R40) until it reaches about 8-8.5 in the fourth reactor (R40). At this pH level, most of the Mn is removed while the Mg co-precipitation is kept at a minimum. After solid/liquid separation, such as with a thickener (T1) or a suitable filter (not shown), the overflow stream (O/F1) proceeds to the oxidative precipitation circuit 3 for treatment with an oxidizing agent (e.g., a mixture of SO$_2$ and air) and with adjustment of pH with a neutralizing agent (e.g., lime) in, for example, three agitated tanks (R1-R3). See FIG. 3. The preferred conditions of the oxidation circuit 3 are pH 6.5, 40° C., and air-2 vol % SO$_2$. The underflow stream (U/F1) thus generated is sent to a slurry neutralization circuit 2.

Figure 3:
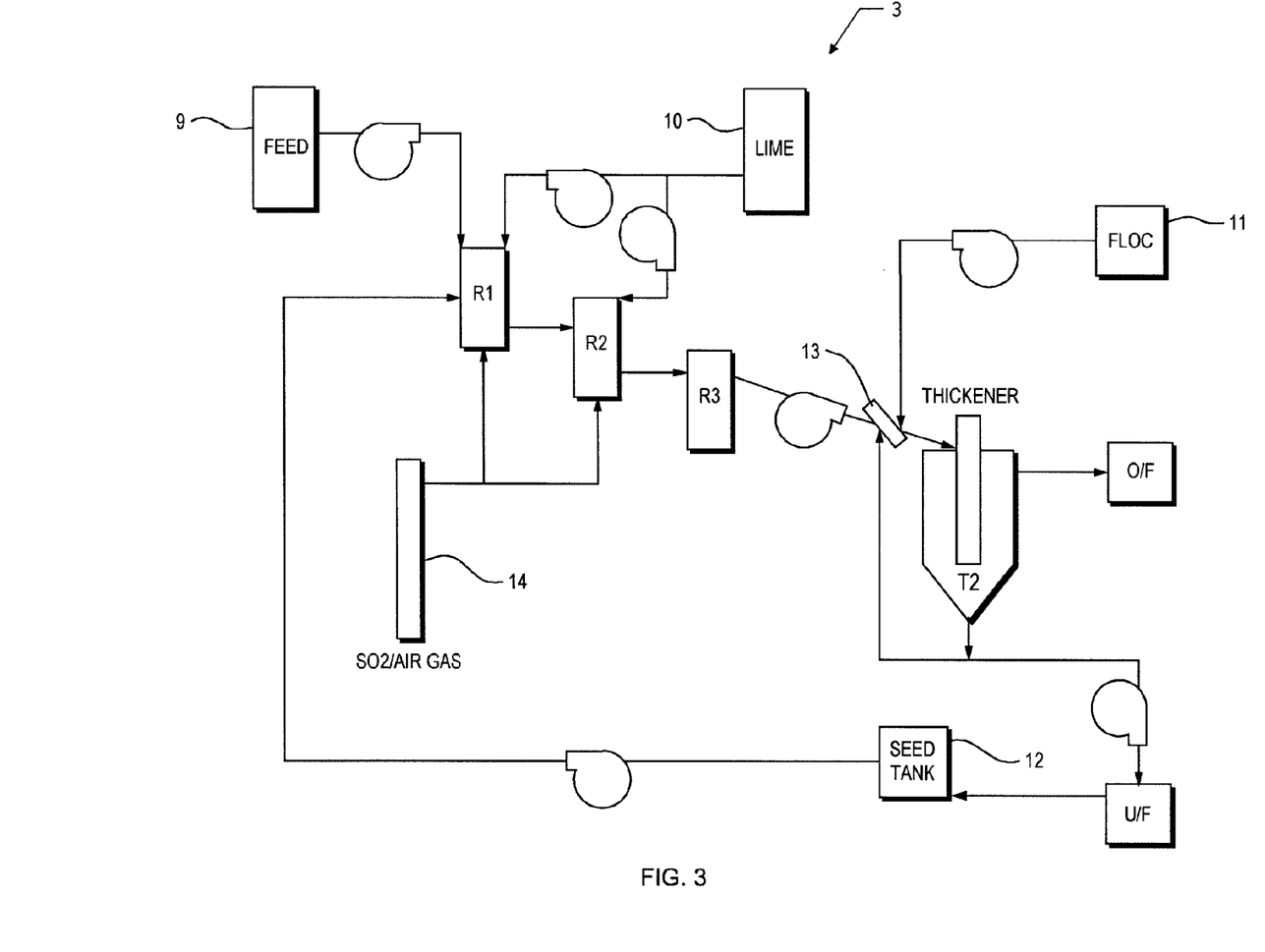
FIG. 3 is a schematic diagram of an oxidative precipitation circuit of the present invention.

FIG. 3 is a schematic diagram of an oxidizing or SO$_2$/air circuit 3 of the present invention. The discharge slurry from the agitated oxidation tanks (R1-R3) is subjected to thickening, and then clarification. The clarified low-Mn overflow (O/F) solution is discharged to the environment. The underflow (U/F) solids are split into two parts. Some of the solids are recycled to the oxidative precipitation circuit 3 as seed. In one embodiment, the seed recycle rate is high, preferably about 1000%. In another embodiment, the high seed recycle rate is critical to achieving low total Mn levels. The remainder of the solids are treated in a separate circuit 15 (FIG. 1) to re-dissolve the Mn in the MnO$_2$ solids as manganous sulfate, for example, using H$_2$SO$_4$ and SO$_2$. The resulting solution, containing gypsum, is recycled to the first stage liquor neutralization circuit 1 where Mn is precipitated as Mn hydroxide, which gets pumped to the slurry neutralization circuit 2 and from there to the tailings pond 4.

The SO$_2$/Air Mn Oxidation-Precipitation Process

An important component of this invention is the development of an oxidative process capable of decreasing the total Mn concentration in the final effluent stream to below 1 mg/L. Although Mn could be readily oxidized to Mn (IV) and precipitated using many oxidants, such as chlorine or hydrogen peroxide or Caro's Acid, the SO$_2$/air mixture is convenient and economic oxidant for the method and system of the present invention. The oxidant is formed from introducing in solution suitable ratios of SO$_2$ and O$_2$. Other suitable oxidants include, without limitation, oxygen gas, oxygen enriched air, sulfur dioxide enriched air, and air.

Zhang et al. [3] showed that the oxidation rate of Mn$^{2+}$ is significantly faster with SO$_2$/O$_2$ than with oxygen alone. In the pH range 1.5-6, Mn oxidation with O$_2$ remained low and independent of pH while oxidation with SO$_2$/O$_2$ was fast and strongly dependent on pH. For a given pH, the batch oxidation rate varied linearly with time. Below pH 3, the SO$_2$/O$_2$ mixture produced little Mn oxidation. Above pH 4, the oxidation rate climbed rapidly.

As noted in Zhang et al. [3], the oxidizing strength of the SO$_2$/O$_2$ mixture is believed to arise from the formation of the following half-cell reaction in the presence of transitional metal catalysts:

The exact mechanism by which these species form is still unclear. However, some experimental evidence suggests the participation of free radicals and Mn$^{3+}$ in the initial reaction mechanism. Berglund et al. [1-2] reported that the addition of Mn$^{3+}$ significantly increased the oxidation rate of Mn$^{2+}$. Zhang et al. [3-4] showed that the addition of 2.7 mM hydroquinone, which is a free radical scavenger and effective reductant for Mn$^{3+}$ and peroxy species, could completely stop the oxidation reaction.

The oxidation of Mn$^{2+}$ by SO$_2$/O$_2$ mixture can lead to the formation of several Mn oxides:

The extent of oxidation and the oxidation product nature depend on both pH and the oxidizing strength of the solution.

EXAMPLE

The important variables affecting the oxidation process include pH, T (temperature), % seed recycle rate, % excess SO$_2$, % SO$_2$ in the SO$_2$/air or O$_2$ gas mixture, and Mn feed tenors. These variables were investigated in batch and continuous bench-scale programs. The optimum levels of these variables were identified from bench-scale testwork, and then they were verified using continuous pilot plant testing.

FIG. 3 shows a SO$_2$/air circuit 3 comprising a feed tank 9, three reactors (R1-R3) in series, a lime tank 10, a floc tank 11, a seed recycle tank 12, and a thickener (T2). As before, filters (not shown) can be substituted for a thickener but thickeners are more economical. The agitation system of the reactors was designed to ensure good gas dispersion capability. It will be appreciated that although three reactors are illustrated, a greater or lesser number can be employed.

The feed was pumped to reactor R1, and then flowed, for example, by gravity between the reactors (R1-R3). Reactor R3 discharge was pumped to the thickener launder box 13 where it was mixed with the flocculent Superfloc™ A-130 before cascading through the launder box and into the feedwell. The U/F product was collected for use as seed recycle. In some steady states, the U/F was recycled directly to the thickener launder box 13 in order to assess the impact of internal recycling on turbidity.

The feed solution analyzed 2.42 g/L Mg, 0.060 g/L Mn, and 0.5 g/L Ca. A gas delivery system 14 was used to sparge a blended air-2 vol % SO$_2$ gas mixture into reactors R1 and R2. R3 was used only for extra retention time; it was maintained at T and its pH monitored but no reagents were added. In the first campaign, six steady states were completed. The main variables investigated were temperature, seed recycle rate and location, and the stoichiometric factor (SF) for SO$_2$ addition. SF was defined as a multiple integer of the stoichiometric SO$_2$ amount required to react with the Mn in the feed solution based on the following reaction:

$$Mn^{2+} + SO_2 + O_2 = Mn^{4+} + SO_4^{2-}$$

Table I shows an example of pilot plant results, which highlights the important role of seed recycle. The recycle modes were no recycle, internal recycle, which refers to recycling the thickener U/F to the thickener launder box 13, or seed recycle to the first oxidation reactor R1. The recycle stream flow rate to reactor R1 was set to give 2.5% solids in the feed to the thickener (T2), which represented a high seed recycle rate as the naturally generated solids constituted only ~0.1% solids in the feed to the thickener (T2).

SF was maintained at 4 in reactor R1 and 1 in reactor R2, except for the last steady state where the SF in reactor R1 was reduced from 4 to 3. The temperature and pH were kept constant at 40° C. and 6.5, respectively. The feed rate to the circuit was adjusted to achieve 30-minute retention time per reactor.

The total Mn content in each profile was obtained using a sample from the O/F stream. Sodium metabisulfite and HCl were used to dissolve Mn from any suspended fines in the O/F stream, and then the total Mn was measured. For comparison and increased accuracy, the total Mn content was obtained using a large 19-L O/F sample collected at the end of each steady state. The sample was filtered and the liquid and solid phases weighed and analyzed. The total Mn was then calculated from the weight of the total suspended solids ("TSS") and their Mn assay.

Although a soluble Mn level ≦0.2 mg/L was achieved in all four steady states, operating without seed recycle generated consistently high levels of total Mn (~5 mg/L Mn) and the concentration of TSS was substantially higher than the other steady states. Internal recycling reduced the Mn level in the O/F stream, giving 1.73 mg/L total Mn compared to ~5 mg/L in the absence of seed recycle. Recycling the solids to reactor R1 gave the best results, decreasing the TSS to 4.2 mg/L and the total Mn content in the O/F to 0.67 mg/L, based on the 19-L sample. It also improved the reaction kinetics as the Mn removal was nearly completed in reactor R1 (99.6%). Reducing SF from 4 to 3 in reactor R1 had no detrimental impact on Mn removal.

These results demonstrated that seed recycle was critical for achieving less than 1 mg/L total Mn in the final effluent according to at least some embodiments of the invention. In the absence of seed, the thickener O/F was dirty and it was difficult to settle the suspended solids even at high floc doses. When seed was recycled to reactor R1, the settling rate and the O/F clarity were dramatically improved.

The testwork demonstrated that under optimum conditions, effluents with less than 1 mg/L total Mn can be achieved. At pH 6.5, 40° C., SF 4 in reactor R1 and 1 in reactor R2, and with % solids in the thickener feed ~2.5%, a soluble Mn level around 0.1 mg/L and total Mn level of ~0.6 mg/L were consistently achieved while keeping the Mg precipitation at less than 1%.

While in accordance with the provisions of the statute, there is illustrated and described herein specific embodiments of the invention. Those skilled in the art will understand that changes may be made in the form of the invention covered by the claims and that certain features of the invention may sometimes be used to advantage without a corresponding use of the other features.

What is claimed is:

1. A method of removing manganese from waste liquor at least containing manganese and magnesium, comprising the steps of:
   (a) adding a first neutralizing agent to a first mixture of waste liquor and a recycled solution to precipitate a majority of the manganese as manganese-containing solids, without precipitating a substantial amount of the magnesium;
   (b) separating the manganese-containing solids to form a manganese-depleted solution;
   (c) oxidizing the manganese-depleted solution formed in step (b) in the presence of recycled seed with an oxidiz-

| | | Mn Concentration, mg/L | | | | 19-L O/F Sample | | | |
|---|---|---|---|---|---|---|---|---|---|
| Recycle | SF in R1 and R2 | R1 | R2 | R3 | Total Mn in O/F | TSS, mg/L | Soluble Mn, mg/L | % Mn in TSS | Total Mn mg/L |
| No | 4 and 1 | 1.63 | <0.05 | <0.05 | 5.97 | 66.80 | 0.05 | 7.20 | 4.86 |
| Internal | 4 and 1 | 3.78 | <0.07 | <0.05 | — | 34.90 | 0.08 | 4.72 | 1.73 |
| 2.5% | 4 and 1 | 0.21 | 0.14 | 0.10 | 0.54 | 4.20 | 0.11 | 13.16 | 0.67 |
| 2.5% | 3 and 1 | 0.64 | 0.24 | 0.17 | 0.34 | 2.70 | 0.14 | 16.63 | 0.59 | ing agent while adjusting the pH with a second neutralizing agent to form an aqueous solution containing manganese precipitate;

(d) transferring the aqueous solution formed in step (c) to a thickener to produce an overflow solution containing a quantity of manganese which is below a predetermined environmental discharge criteria and an underflow solution containing manganese precipitate;

(e) discharging the overflow and underflow solutions from the thickener;

(f) separating the manganese precipitate from the underflow solution;

(g) recycling a portion of the separated manganese precipitate to step (c) as the recycled seed;

(h) dissolving a remaining portion of the separated manganese precipitate to form the recycled solution; and (i) transferring the recycled solution to step (a).

2. The method of claim 1, wherein the neutralizing agent is an alkali or alkaline earth metals compound.

3. The method of claim 1, wherein the neutralizing agent is selected from at least one of the group consisting of alkali earth metal compounds, alkaline earth metal compounds, sodium hydroxide, ammonium hydroxide, potassium hydroxide, sodium carbonate and calcium carbonate.

4. The method of claim 1, wherein the neutralizing agent is at least one of lime and limestone.

5. The method of claim 1, wherein the pH of step (a) is adjusted with first the neutralizing agent to about 8-8.5.

6. The method of claim 1, wherein step (a) is performed in a reactor.

7. The method of claim 1, wherein the pH of step (a) is adjusted with the first neutralizing agent to about 8-8.5 in a stepwise manner using a plurality of serially connected reactors.

8. The method of claim 1, wherein step (a) is performed with a plurality of reactors.

9. The method of claim 8, wherein the first neutralizing agent is added to at least one of the reactors.

10. The method of claim 1, wherein the waste liquor contains about 2 g/L of manganese.

11. The method of claim 1, wherein the waste liquor contains about 1-3 g/L of manganese.

12. The method of claim 1, wherein less than 1% of magnesium precipitates from the waste liquor.

13. The method of claim 1, wherein the separation step (b) further comprises:

transferring the mixture formed in step (a) to a first circuit thickener to produce the manganese-depleted solution and an underflow stream with the manganese-containing solids; and discharging the underflow stream to a slurry neutralization circuit and/or disposal facility.

14. The method of claim 1, wherein the manganese-depleted solution contains less than 500 mg/L of manganese.

15. The method of claim 1, wherein the oxidizing agent is selected from at least one of the group consisting of oxygen gas, sulfur dioxide gas and oxygen, oxygen enriched air, sulfur dioxide enriched air and air.

16. The method of claim 1, wherein the oxidizing agent is sulfur dioxide and air.

17. The method of claim 16, wherein the pH of step (c) is adjusted to above 4.

18. The method of claim 1, wherein the oxidizing agent is air-2 vol % sulfur dioxide gas mixture.

19. The method of claim 1, wherein the pH of step (c) is adjusted to between about 5-8.

20. The method of claim 1, wherein, the pH of step (c) is adjusted to about 6.5 and the temperature is adjusted to about 40° C.

21. The method of claim 1, wherein the pH of the step (c) is adjusted to about 1.5-6 in the presence of oxygen.

22. The method of claim 1, wherein step (c) is performed in a single reactor.

23. The method of claim 1, wherein step (c) is performed in a plurality of serially connected reactors.

24. The method of claim 23, wherein the second neutralizing agent is added to at least one of the reactors.

25. The method of claim 1, wherein step (d) further comprises mixing the aqueous solution with a flocculating agent.

26. The method of claim 1, wherein step (d) further comprises mixing the aqueous solution with a flocculating agent before introducing the aqueous solution to the thickener.

27. The method of claim 1, wherein the discharged overflow solution contains less than 1 mg/L of manganese.

28. The method of claim 1, wherein the discharged overflow solution contains about 1-5 mg/L of manganese.

29. The method of claim 1, wherein the manganese precipitate in step (h) is dissolved with $H_2SO_4$ and $SO_2$.

30. A method of removing manganese from waste liquor at least containing manganese and magnesium, comprising the steps of:

(a) adjusting the pH of a first mixture of waste liquor and a recycled solution to about 8-8.5 with a first neutralizing agent to precipitate a majority of the manganese as manganese-containing solids, without precipitating a substantial amount of the magnesium;

(b) removing the manganese-containing solids to form a manganese-depleted solution;

(c) oxidizing the manganese-depleted solution formed in step (b) in the presence of recycled seed with an oxidizing agent while controlling the pH with a second neutralizing agent to form an aqueous solution containing manganese precipitate;

(d) mixing the aqueous solution with a flocculating agent;

(e) transferring the aqueous solution of step (d) to a thickener to produce an overflow solution containing less than 1 mg/L of manganese and an underflow solution containing manganese precipitate;

(f) discharging the overflow and underflow solutions from the thickener;

(g) separating the manganese precipitate from the underflow solution;

(h) recycling a portion of the separated manganese precipitate to step (c) as the recycled seed;

(i) dissolving a remaining portion of the separated manganese precipitate to form the recycled solution; and (j) transferring the recycled solution to step (a), wherein in step (c), the pH is adjusted to about 6.5 and the temperature is adjusted to about 40° C.

31. The method of claim 30, wherein the neutralizing agent is an alkali or alkaline earth metals compound.

32. The method of claim 30, wherein the neutralizing agent is at least one of lime and limestone.

33. The method of claim 30, wherein the oxidizing agent is air-2 vol % sulfur dioxide gas mixture.

34. The method of claim 30, wherein the pH of step (a) is adjusted with the first neutralizing agent to about 8-8.5 in a stepwise manner using a plurality of serially connected reactors.

35. The method of claim 30, wherein step (c) is performed in a single reactor or in a plurality of serially connected reactors, wherein if the plurality of serially connected reactors is employed, the second neutralizing agent is added to at least one of the reactors.

36. The method of claim 30, wherein the manganese precipitate in step (i) is dissolved with $H_2SO_4$ and $SO_2$.

37. A method of removing manganese from waste liquor at least containing manganese and magnesium, comprising the steps of:
   (a) mixing a first neutralizing agent and the waste liquor to adjust the pH to about 8-8.5 and to precipitate a majority of the manganese as manganese-containing solids, without precipitating a substantial amount of the magnesium;
   (b) removing the manganese-containing solids to form a manganese-depleted solution;
   (c) oxidizing a mixture of the manganese-depleted solution and a separated manganese precipitate with an oxidizing agent while adjusting the pH to above 4 with a second neutralizing agent to form an aqueous solution containing manganese precipitate;
   (d) transferring the aqueous solution formed in step (c) and mixed with a flocculating agent to a thickener to produce an overflow solution containing a quantity of manganese which is below a predetermined environmental discharge criteria and an underflow solution containing manganese precipitate;
   (e) discharging the overflow and underflow solutions from the thickener;
   (f) separating the manganese precipitate from the underflow solution; and
   (g) recycling a portion of the separated manganese precipitate to step (c).

38. The method of claim 37, wherein the neutralizing agent is an alkali or alkaline earth metals compound.

39. The method of claim 37, wherein the neutralizing agent is at least one of lime and limestone.

40. The method of claim 37, wherein the oxidizing agent is air-2 vol % sulfur dioxide gas mixture.

41. The method of claim 37, wherein step (c) is performed in a single reactor or in a plurality of reactors connected in series, wherein if the plurality of serially connected reactors is employed, the second neutralizing agent is added to at least one of the reactors.

42. The method of claim 37, wherein the pH in step (a) is adjusted with the first neutralizing agent in a stepwise manner using a plurality of serially connected reactors.

43. A method of selectively decreasing waste liquor Mn concentration to about or less than 1 mg/L total Mn while minimizing the precipitation of Mg, comprising:
   (a) decreasing waste liquor Mn concentration from about 2 g/L to <500 mg/L by effecting pH adjustment with a neutralizing agent;
   (b) decreasing Mn concentration of pH adjusted waste liquor to less than 1 mg/L by effecting oxidative precipitation with a oxidizing agent;
   (c) recovering manganese precipitate formed in step b;
   (d) recycling a portion of the recovered manganese precipitate to step b;
   (e) dissolving a remaining portion of the recovered manganese precipitate; and
   (f) recycling the dissolved manganese precipitate to step a.

44. The method of claim 43, wherein the neutralizing agent is selected from at least one of the group consisting of alkali or alkaline earth metals compound, sodium hydroxide, potassium hydroxide, sodium carbonate and calcium carbonate, lime and limestone.

45. The method of claim 43, wherein the oxidizing agent is air-2 vol % sulfur dioxide gas mixture, oxygen gas, sulfur dioxide gas and oxygen, oxygen enriched air, sulfur dioxide enriched air and air.

46. The method of claim 43, wherein the pH in the second reducing step is adjusted to between about 5-8.

47. The method of claim 43, wherein, the pH in the second reducing step is adjusted to about 6.5 and the temperature is adjusted to about 40° C.

48. The method of claim 43, wherein the pH in the first reducing step is adjusted to about 8-8.5.

49. The method of claim 43, wherein the precipitation of Mg is less than 1%.

* * * * *

UNITED STATES PATENT AND TRADEMARK OFFICE
CERTIFICATE OF CORRECTION

PATENT NO.         : 7,641,801 B2
APPLICATION NO.    : 11/679917
DATED              : January 5, 2010
INVENTOR(S)        : Mohamed Buarzaiga et al.

It is certified that error appears in the above-identified patent and that said Letters Patent is hereby corrected as shown below:

Title Page

In (75) Inventors, please add the following inventors names and addresses:

--Jean-Paul Raymond DUTERQUE, Noumea (NC);
Jean-Jacques Robert PERRAUD, Mont-Dore (NC)--.

Signed and Sealed this
Eighth Day of March, 2011

David J. Kappos
*Director of the United States Patent and Trademark Office*